United States Patent [19]
Grotzinger et al.

[11] Patent Number: 5,450,245
[45] Date of Patent: Sep. 12, 1995

[54] LASER ALIGNMENT APPARATUS

[75] Inventors: Timothy L. Grotzinger, Manheim; William C. Yager, Blue Bell, both of Pa.

[73] Assignee: Laser Communications, Inc., Lancaster, Pa.

[21] Appl. No.: 143,179

[22] Filed: Oct. 26, 1993

[51] Int. Cl.⁶ .................................................. G02B 7/02
[52] U.S. Cl. .................................. 359/822; 359/819; 385/93; 385/52
[58] Field of Search .................... 358/819, 822, 826; 385/52, 93

[56] References Cited

U.S. PATENT DOCUMENTS

| | | | |
|---|---|---|---|
| 2,494,645 | 1/1950 | Collins | 359/159 |
| 4,764,983 | 8/1988 | Walter | 359/159 |
| 4,867,560 | 9/1989 | Kunitsugu | 359/159 |
| 4,879,764 | 11/1989 | Walter | 359/159 |
| 4,882,772 | 11/1989 | Rist et al. | 359/159 |
| 4,993,801 | 2/1991 | Sarraf | 359/641 |
| 4,999,506 | 3/1991 | Mizusawa et al. | 250/491.1 |
| 5,283,802 | 2/1994 | Hsiung | 385/93 |

FOREIGN PATENT DOCUMENTS

| | | | |
|---|---|---|---|
| 3705408 | 8/1988 | Germany | 385/52 |
| 0006510 | 1/1988 | Japan | 359/826 |
| 0270009 | 10/1989 | Japan | 385/52 |

Primary Examiner—Georgia Y. Epps
Assistant Examiner—Thomas D. Robbins
Attorney, Agent, or Firm—Martin Fruitman

[57] ABSTRACT

The apparatus is a laser transmitter and receiver unit with independent adjustment of the focus of each and preservation of precise parallel alignment between the two lines of sight. The transmitter laser and the receiver photodetector are each mounted in a precisely machined two part mounting assembly. The first part of both mounting assemblies includes an objective lens and is fitted against the same precise surface of a reference fixture. The second part of each mounting assembly, holding the laser or photodetector, is connected to the first part by means of precisely mated coaxial sliding cylinders, so that the laser or photodetector can be replaced on the fixture with high accuracy. Axial adjustment of the distance of the laser or photodetector from their respective objective lenses is furnished by spacer washers inserted between the two parts of the assemblies. Thus, once a laser or photodetector is initially aligned relative to a common reference surface, each one can be moved closer to or farther from its respective objective lens without affecting the parallelism of the laser and photodetector lines of sight.

8 Claims, 2 Drawing Sheets

LASER ALIGNMENT APPARATUS

SUMMARY OF THE INVENTION

This invention deals generally with optics systems and elements and more specifically with optical communications and the optical alignment between transmitters and receivers in such systems.

Laser communications systems have many advantages, one of the most important of which is the security available from the point to point nature of the transmission path. Since the transmission is specifically directed from the transmitter to the receiver, it is inherently highly secure because signal interception requires actual interception of the line of sight path. Unfortunately however, the requirement for line of sight interception also brines with it a problem which is unique to laser communication, the need for highly accurate and stable, but adjustable, mounting arrangements. The mounting arrangement for the optical components of a laser station must fix those components in a position so that no inadvertent motion occurs, but it still must permit convenient initial alignment of the transmitter with the intended receiver, and also permit convenient field adjustment and servicing of the unit without destroying the alignment, even when the cabinet cover of a station is removed for servicing. At typical transmitter to receiver distances of one kilometer, even a very small misalignment will cause the laser beam to completely miss the receiver and therefore prevent operation of the communication system.

The criteria for the alignment of a combined transmitter and receiver unit are even more stringent. Although a typical unidirectional laser communication system requires only that the laser transmitter properly illuminate the photodetector of the receiver, the criteria for a two way communication system, one in which laser signals are transmitted in both directions between two similar stations, are much more difficult to accomplish. Such a system requires not only that the laser beams be targeted upon their respective remote receivers, but that the lines of sight of each transmitter and its adjacent receiver be exactly parallel. If the lines of sight are not parallel, with the great distances between stations, when the first laser beam is aimed correctly, the second laser beam can completely miss the receiver that is located in the same cabinet as, and very close to, the laser transmitter of the first beam.

The manufacture and installation of a unitized transmitter and receiver therefore require much greater precision in regard to alignment than does a simple unidirectional laser link. Moreover, the problem with a combined laser transmitter and receiver is further complicated by the necessary mechanical association between the optical systems and the cabinetry in which they are mounted. Clearly, mounting the cabinet of one laser communications station in perfect alignment with the cabinet of its associated station assures nothing about the alignment of the laser beams if the relationships between the cabinet and the laser source, the laser lens, the photodetector and the photodetector lens in each cabinet are not precisely controlled.

The present invention solves these problems by using an optically precise reference surface on a reference fixture within each cabinet and controlling the geometric relationships between the reference fixture and both the transmitter laser and the receiver photodetector. The reference fixture is itself rigidly attached on the base of the cabinet so that alignment of the cabinet can aid in alignment of the laser beams with other receiving and transmitting stations. However, removal of the cabinet cover, which attaches to the cabinet base, does not affect optical alignment.

The premise upon which alignment is based is that the mounting assemblies for both the laser and photodetector are mounted on the same reference surface with precisely machined mating surfaces, and that the mounting assemblies are themselves precisely constructed to maintain alignment between the lenses and the laser and photodetector, regardless of whether the mounting assemblies are disassembled and reassembled. The reference fixture includes one precise, flat, reference surface which is located across the front of the cabinet and is oriented perpendicular to the laser beam. This reference surface includes two holes into which are inserted the mounting assemblies for the laser and photodetector.

The mounting assemblies, which are identical except for the inclusion of either the laser or the photodetector, each have a machined mating surface which fits against the reference surface adjacent to the holes. The cylindrical structure of the mounting assembly is constructed to be precisely perpendicular to the mating surface, so that the axis of the mounting assembly can then be used as a secondary reference against which to align the laser or photodetector.

Each mounting assembly is constructed of two subassemblies. The first subassembly holds the objective lens and is located in the front of the mounting assembly. It is this first subassembly that includes the mating surface that fits against the reference surface. The lens in each first subassembly is fitted against a lens shelf in the subassembly that is parallel to the mating surface, and each lens component is optically centered on the mechanical axis of that subassembly. Thus, the orientation of each lens is permanently fixed relative to the reference surface, assuring that the lenses are always correctly positioned relative to the reference fixture, and only the positions of the laser source and photodetector are variable.

However, the field adjustments of the laser source and photodetector are limited to a single dimension, the direction parallel to the laser beams. This limitation is accomplished by attaching the laser source and photodetector to a second subassembly with close tolerances.

The second subassembly of each mounting assembly, holding the laser or photodetector, is connected to the first subassembly by means of precisely mated coaxial sliding cylinders an each subassembly, so that the laser or photodetector can be moved axially or replaced an the mounting assembly with high accuracy. Axial adjustment of the distance of the laser or photodetector to their lenses is furnished by spacer washers inserted between the two subassemblies. Thus, once a receiver's line of sight is initially aligned parallel with its adjacent transmitter's line of sight, either the laser or the photodetector can be moved closer to or farther from its respective objective lens without affecting the parallel alignment, because the close tolerance mating cylinders restrict motion-transverse to the beam axis over the entire length of the mating cylinders.

Adjustment in the direction of the laser beams, that is, closer to or farther from the fixed lenses, is desirable for the second subassemblies in order to accomplish adjustment of beam size for the beam being generated by the laser and to locate the photodetector in the focal plane of its lens. Such adjustment can be attained by removing the second subassembly, which includes either the laser source or the photodetector, inserting or removing spacer washers between the two subassemblies, reassembling the second subassembly onto the first subassembly and locking the subassemblies together after the change in spacers.

While the spacer washers and coaxial mating cylinders provide the means for assuring that the laser source and photodetector do not change their orientations during linear adjustment along the beam direction, the laser source and photo detector must still be adjustable to assure that they are properly positioned relative to their respective lenses.

This adjustment is accomplished in both second subassemblies by the same structure. The only important difference in the structure is the direct substitution of the photodetector for the laser. The laser is mounted in a hole in a block shaped collar that is captured between four screws that are all located in the same plane and contact four sides of the collar. The fifth and sixth surfaces of the collar are also trapped within the subassembly by surfaces machined perpendicular to the beam axis, so that adjustment of the screws moves the laser only in a plane perpendicular to the mechanical axis of the subassembly. Focus and centering control of the beam are therefore independent.

These centering adjustments are customarily done during initial assembly of a transmitter-receiver, and in fact, since the lasers and photodetectors are all adjusted in the factory relative to a standard reference lens, field substitution of second subassemblies can be accomplished with no perceptible error in centering.

However, there are occasions after installation when the distance of the laser source to its lens must be adjusted in order to adjust the laser beam size. Previous adjustment methods used simple screw adjustments, but because of the tolerances associated with screw threads, such adjustments have been found to also change the direction of the beam. With the present invention, although the mounting assembly is actually disassembled to insert or remove spacer washers, after reassembly the second subassembly is returned to its repeatable accurate alignment by being centered by the concentric cylinders and clamped against the first subassembly.

The present invention therefore furnishes a laser beam size and photodetector focus adjustment system that maintains the accurate co-alignment of the transmitter and receiver, and thus permits adjustment by personnel who need not be capable of realignment.

DETAILED DESCRIPTION OF THE INVENTION

Figure 1:
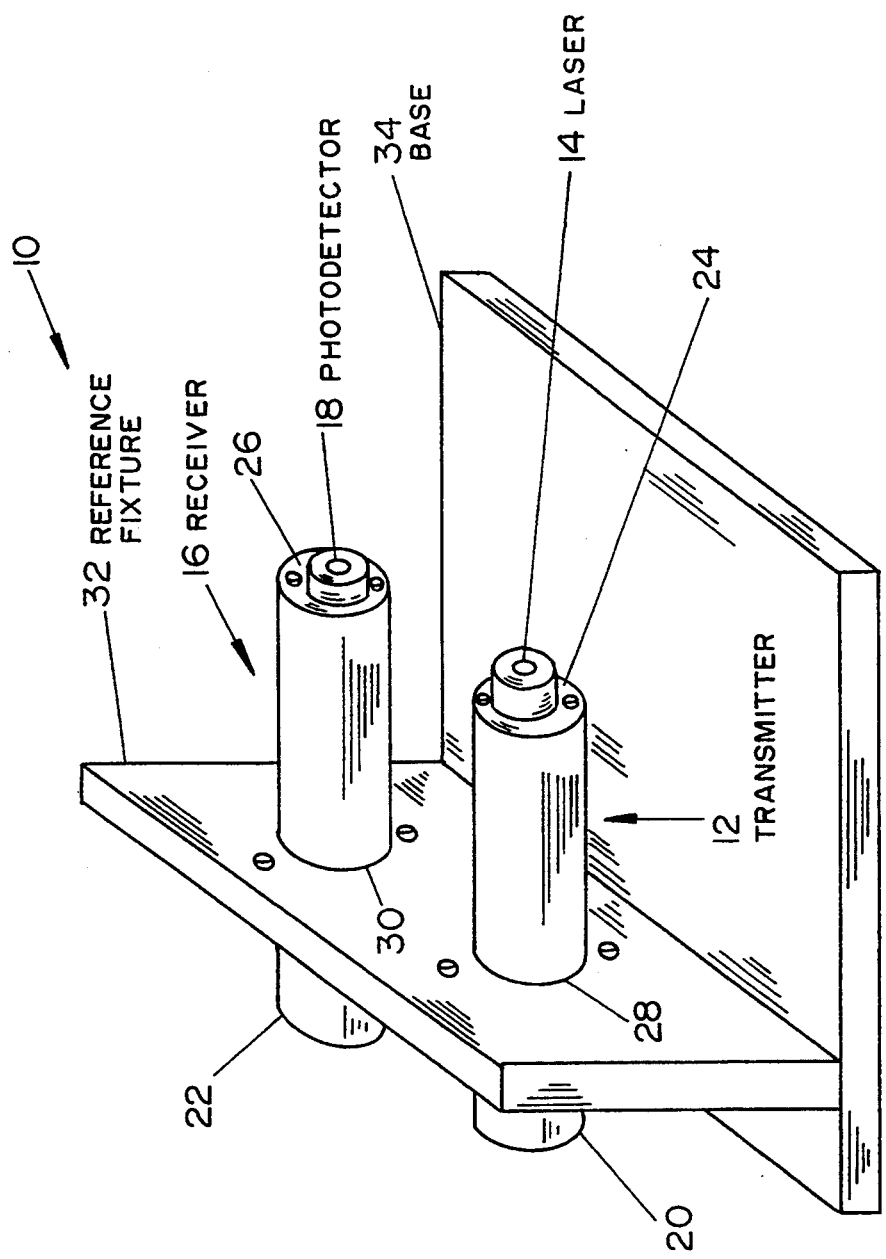
FIG. 1 is a perspective view of a laser communication station containing both a transmitter and a receiver alignment apparatus of the preferred embodiment.

FIG. 1 is a perspective view of laser communication station 10 which includes transmitter alignment apparatus 12 containing laser 14 and receiver alignment apparatus 16 which contains photodetector 18. Alignment apparatus 12 and 16 each include a first subassembly, 20 and 22, which includes objective lenses, and second subassembly, 24 and 26, which contain laser 14 and photodetector 18, respectively.

Alignment assembly 12 and 16 are inserted in holes 28 and 30 respectively which are located in reference fixture 32. Reference fixture 32 is rigidly attached to base 34 to which are attached all the other components (not shown) of laser communication station 10.

Figure 2:
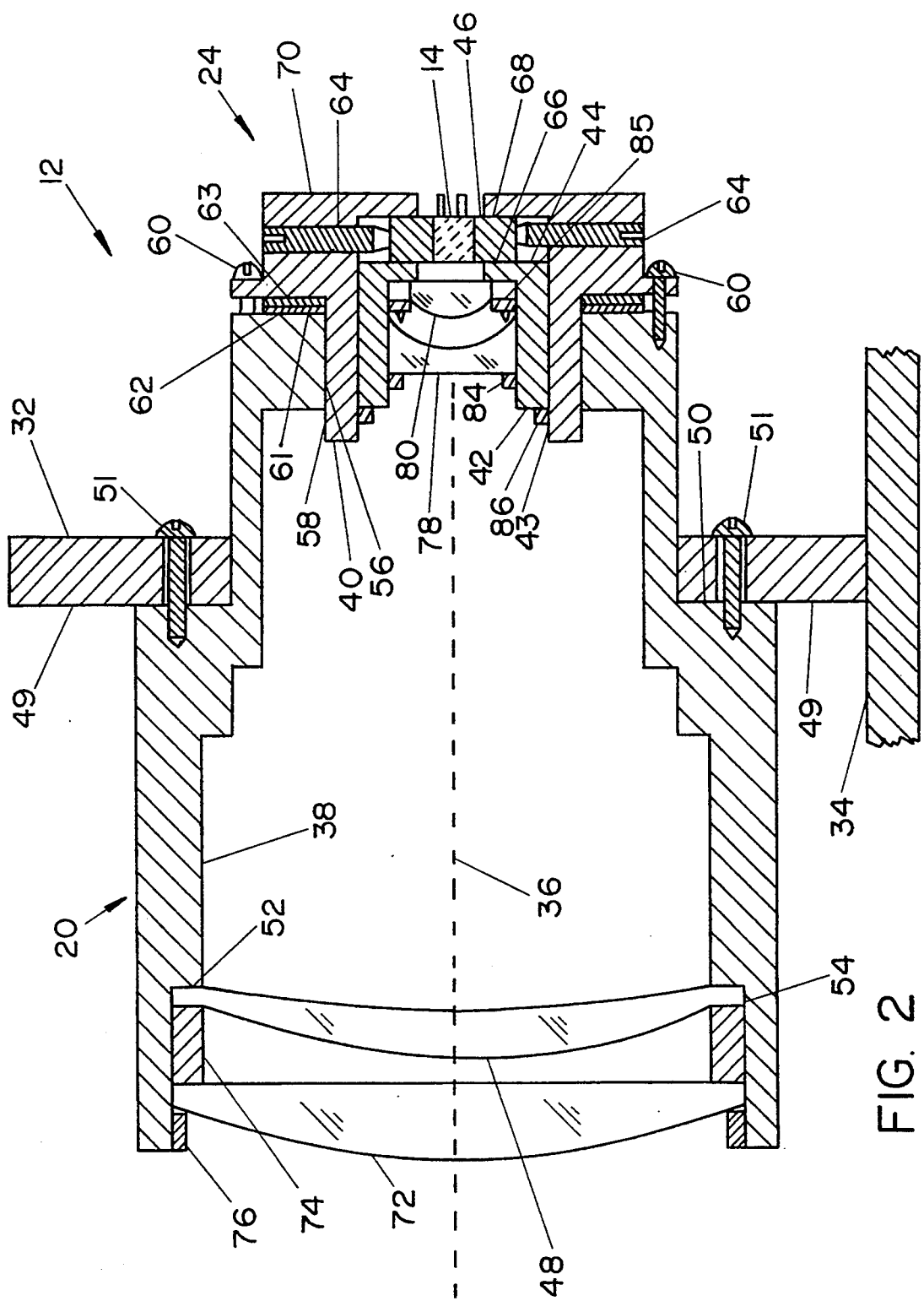
FIG. 2 is an axial cross section view of the cylindrical mounting assembly of the preferred embodiment of the invention.

The relationship of the components pictured in FIG. 1 can be better understood by reference to FIG. 2 and the following detailed description.

FIG. 2 is an axial cross section view of laser alignment apparatus 12 of the preferred embodiment in which reference fixture 32 is supported by and attached to base 34 which is part of laser communication transmitter and receiving station 10. Such a station includes two alignment arrangements such as alignment apparatus 12 and 16 as seen in FIG. 1. However, the only distinction between alignment apparatus 12 for the laser transmitter which is shown in FIG. 2 and alignment apparatus for the laser receiver which is not shown in FIG. 2 is that laser 14 would be replaced with photodetector 18 and the configuration of the various lenses shown in FIG. 2 might change.

The essential purpose of alignment apparatus 12 is to align beam path 36 of the laser beam generated by laser 14 with the exact axis of lens fixture 38 and assure that beam path 36 is precisely parallel to the line of sight of photodetector 18 (FIG. 1) in adjacent similar receiver alignment apparatus 16. This is accomplished by arranging that both laser 14 and photodetector 18 located nearby are aligned with their respective objective lenses so as to produce lines of sight that are precisely perpendicular to reference surface 49 of reference fixture 32.

This is accomplished by constructing second subassembly 24 to have mating cylinder 40 and lens mount 42 that are precisely coaxial with lens fixture 38. Mating cylinder 40 is also constructed to have inside cylinder 43 coaxial with lens fixture 38, and rear surface 44 of lens mount 42 is perpendicular to beam path 36, so that collar 46, which holds laser 14, is constrained to move only in a plane perpendicular to beam path 36.

To accomplish the proper precision for parallel beams certain past tolerances are, of course, required. These tolerances begin on reference 32 with reference surface 49 which is machined flat to within ±0.001 inch. On first subassembly 20, rear surface 50 and stop surface 52 of lens fixture 38 are then machined flat to the same tolerance of ±0.001 inch, while stop surface 52 is made parallel to rear surface 50 to a tolerance of ±0.0001/1.0. Lens cylinder 54 and cylinder surface 56 on fixture 38 are machined concentric to each other to a tolerance of ±0.001 inch and perpendicular to rear surface 50 to a tolerance of ±0.0001/1.0. Thus, all critical tolerances of first subassembly 20 are referenced to rear surface 50 which is held tightly against precision reference surface 49 by screws 51.

Similar tolerances are maintained on second subassembly 24, so that the outside mating surface 58 of mating cylinder 40 which contacts mating cylinder surface 56 and inside cylinder surface 43 of mating cylinder 40 which holds lens mount 42 are concentric to a tolerance of ±0.001 inch. Thus, laser 14 can move only parallel to beam path 36 whenever second subassembly 24 is inserted into first subassembly 20 and secured by screws 60.

It is this precision which makes it possible to remove second subassembly 24, insert or remove spacer washers 62, and replace second subassembly 24, recovering exactly the previous transverse alignment. Spacer washers are clamped between two surfaces which are transverse to beam path 36. One is first stop 61 on first subassembly 20 and is oriented transverse to cylindrical mating surface 56 of lens fixture 38. The second clamping surface is second stop 63 on second subassembly 24 and is oriented transverse to cylindrical mating surface 58 of mating cylinder 40.

The addition or subtraction of spacer washers 62 is the means of varying the laser beam size or the photodetector focus, and this is the only true field adjustment. Because of the fixed alignment of the apparatus, however, the insertion or removal of spacer washers 62 can not affect dimensions other than the axial distance between lens 48 and laser 14 or photodetector 18. Spacer washers 62 fit around mating cylinder 40 and are typically 0.010 inch thick so that the increments of adjustment of the axial distance to lens 48 are small enough to permit fine adjustment.

One other adjustment is available in the invention, but it is intended to be an initial factory adjustment. Laser 14 or photodetector 18 (FIG. 1) can be adjusted in a plane perpendicular to the beam path by means of screws 64 acting upon collar 46 which holds either laser 14 or photodetector 18. Collar 46 is rectangular in cross section with machined front surface 66 tight against lens mount 42 and back surface 68 held against back plate 70. Collar 46 can therefore only move in the plane determined by the space between lens mount 42 and back plate 70, and this motion is restricted and controlled by four screws 64 threaded into the rear portion of mating cylinder 40. Only two screws 64 can be seen in FIG. 2, the upper and lower ones. The other screws are in the same plane and oriented at 90 degrees to those shown, so that they restrict the movement of collar 46 in the directions in and out of the paper. It is the machined surface 66 on lens mount 42 and surface 68 against back plate 70 which restrict motion of collar 46 to a plane perpendicular to beam path 36 while the adjustment of screws 64 moves collar 46 and laser 14 transverse to beam path 36. This permits laser 14, or photodetector 18, to be aligned with respect to lens 48. This adjustment is generally made at initial assembly of the apparatus and need not be changed at a later time.

The assembly of the precision parts of the apparatus follows conventional practice. Lens 48, lens 72 and retainer ring 76, with spacer ring 74 between the lenses, are cemented in place at the front of first subassembly 20, and first subassembly 20 is held attached to reference fixture 32 by screws 51.

Laser 14 and photodetector 18 are each cemented into their respective collars 46, while lenses 78 and 80 are held in lens holder 42 by retainer 84 and centered in lens holder 42 by centering fixture 85. Lens holder 42 is also held in mating cylinder 40 by spring "C" ring 86, while second subassembly 24 is held into first subassembly 20 by screws 60. These screws are temporarily removed and second subassembly 24 slid away from first subassembly 20 to insert or remove spacer washers 62 which are clamped between first subassembly 20 and second subassembly 24.

The present invention thereby furnishes a simple means for adjusting the focus of the transmitter and receiver assemblies of a laser communication station while eliminating any possibility of affecting the parallel alignment of the two beams.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a single adjustment apparatus can be used in a station which contains only a transmitter or only a receiver, and the linear adjustment apparatus of the invention could be used without the axial centering apparatus. Furthermore, additional components, such as infrared filters, can be added to the transmitter and receiver assemblies without affecting the invention.

What is claimed as new and for which Letters patent of the United States are desired to be secured is:

1. An apparatus for adjusting the distance of a laser beam generator from a lens comprising:

a first subassembly including a lens with an optical axis and a lens fixture holding the lens, with the lens fixture including a smooth first cylindrical surface whose axis is aligned with the optical axis of the lens, and the first subassembly also including a first stop surface oriented transverse to the first cylindrical surface;

a second subassembly including a laser beam generator and a mating fixture holding the laser beam generator, with the mating fixture including a smooth second cylindrical surface constructed concentric with, located adjacent to, and sized to fit into intimate contact with the first cylindrical surface, and the second subassembly also including a second stop surface oriented transverse to the second cylindrical surface; and at least one spacer located between the first stop surface and the second stop surface with a spacer in contact with both the first stop surface and the second stop surface to determine a spacing between the lens and the laser beam generator.

2. The apparatus of claim 1 wherein the first subassembly is attached to a reference fixture, and a reference surface on the first subassembly is held adjacent to a reference surface of the reference fixture to determine the orientation of the laser beam generator relative to the reference fixture.

3. The apparatus of claim 2 wherein the reference fixture is attached to a base of a laser communication station.

4. The apparatus of claim 1 further including a positioning means for the laser beam generator comprising a slidable collar held within the mating fixture with the collar holding the laser beam generator and the collar movable only in directions perpendicular to the axis of the first cylindrical surface.

5. An apparatus for adjusting the distance of a photodetector from a lens comprising:

a first subassembly including a lens with an optical axis and a lens fixture holding the lens, with the lens fixture including a smooth first cylindrical surface whose axis is aligned with the optical axis of the lens, and the first subassembly also including a first stop surface oriented transverse to the first cylindrical surface;

a second subassembly including a photodetector and a mating fixture holding the photodetector, with the mating fixture including a smooth second cylindrical surface constructed concentric with, located adjacent to, and sized to fit into intimate contact with the first cylindrical surface, and the second subassembly also including a second stop surface oriented transverse to the second cylindrical surface; and at least one spacer located between the first stop surface and the second stop surface with a spacer in contact with both the first stop surface and the second stop surface to determine a spacing between the lens and the photodetector.

6. The apparatus of claim 5 wherein the first subassembly is attached to a reference fixture, and a reference surface on the first subassembly is held adjacent to a reference surface of the reference fixture to determine the orientation of the photodetector relative to the reference fixture.

7. The apparatus of claim 6 wherein the reference fixture is attached to a base of a laser communication station.

8. The apparatus of claim 5 further including a positioning means for the photodetector comprising a slidable collar held within the mating fixture with the collar holding the photodetector and the collar movable only in directions perpendicular to the axis of the first cylindrical surface.

* * * * *